D. HAYES.
Mode of Stowing Cotton.

No. 199,975. Patented Feb. 5, 1878.

WITNESSES:
Francis McArdle,
C. Sedgwick

INVENTOR:
D. Hayes
BY
ATTORNEYS.

UNITED STATES PATENT OFFICE.

DANIEL HAYES, OF NEW ORLEANS, LOUISIANA.

IMPROVEMENT IN MODES OF STOWING COTTON.

Specification forming part of Letters Patent No. 199,975, dated February 5, 1878; application filed January 5, 1878.

*To all whom it may concern:*

Be it known that I, DANIEL HAYES, of New Orleans, in the parish of Orleans and State of Louisiana, have invented a new and Improved Mode of Stowing Cotton, of which the following is a specification:

The object of my invention is to provide an improved mode of stowing cotton in vessels for transportation.

The invention consists in the mode of stowing cotton by connecting together the two opposite upper and lower surfaces of two adjacent bales by hooks and adjustable chains while under the pressure of the jack-screw, in the manner as will be hereinafter described.

Figure 1:
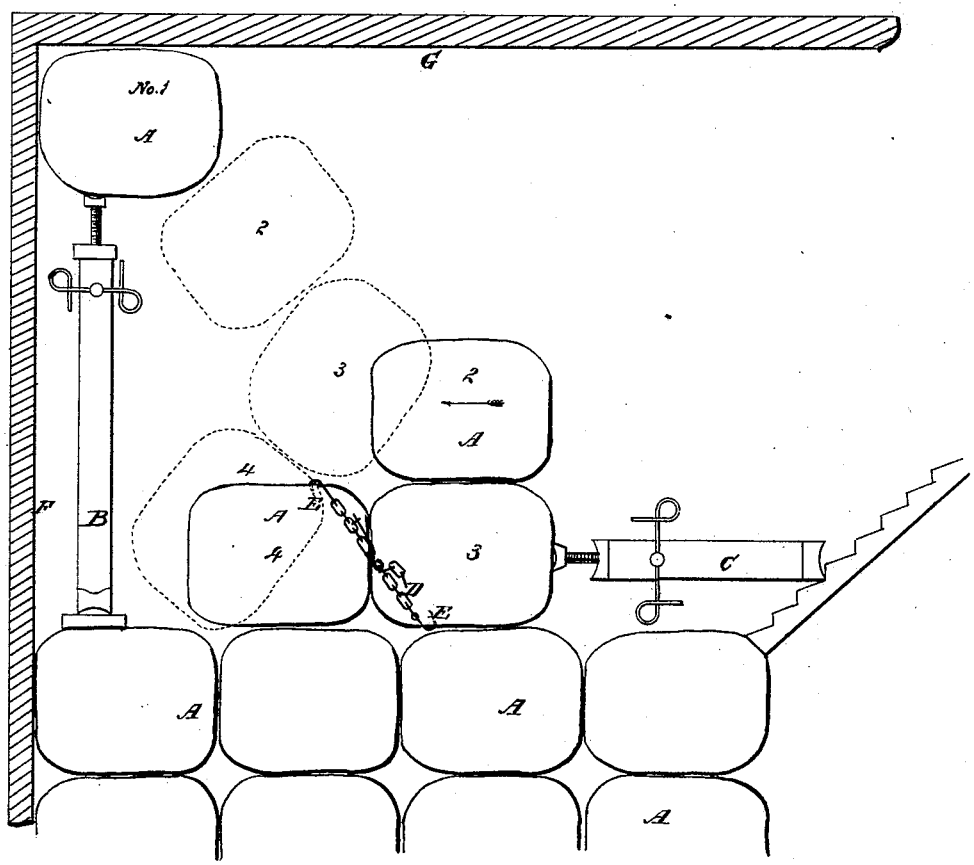
Figure 2:
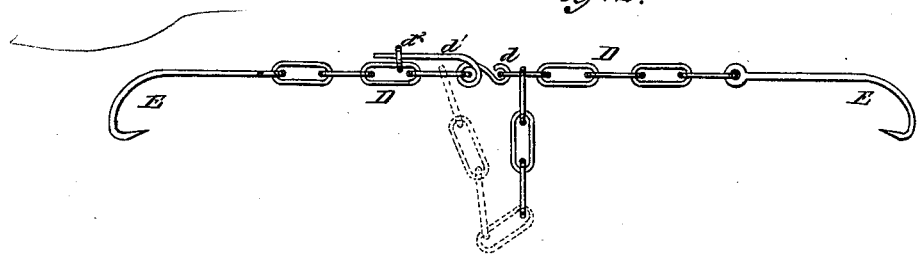

In the accompanying drawing, Figure 1 represents a partial section of a ship's hold, illustrating my improved mode of stowing cotton-bales. Fig. 2 is a detail of the adjustable chain.

Similar letters of reference indicate corresponding parts.

A are the cotton-bales. B and C are jack-screws; D E, adjustable chain and hooks. F is the ship's side, and G the deck.

The bales being packed in the hold of the vessel to within convenient distance of the deck, this distance is then filled with rows of bales, packed tightly against the ship's side in the following manner: The bale marked No. 1 is supported in the angle formed of the deck G and the side F by one or more jack-screws B. Two bales, Nos. 3 and 4, are then placed close together, and the upper side of bale No. 4 connected with the lower side of bale No. 3, near the line of contact between the two bales, by the hooks E and the adjustable chain D, in such a manner that the bale No. 3 cannot be raised or turned in the direction of the bale No. 4 without the latter rising and turning with it. Now, one or more bales, according to the space required to be filled, are then placed on top of No. 3. No. 2 represents such a bale. The jack-screw C being applied, as shown in the drawing, bale No. 3 rises and carries bale No. 2 up against bale No. 1, supporting the latter, as shown in dotted lines, while the jack-screw B is being removed, and revolves bale No. 4 with itself into the desired position against the ship's side. One pair of hooks and chain is used at each end of the bales Nos. 3 and 4.

The chain D, connecting together the hooks E, is made adjustable by pivoting on one of the chain-links a hook, $d$, provided with a lever or handle, $d^1$, and securable in position by the link $d^2$, attached to the chain D, being put over the lever $d^1$. By inserting the hook $d$ in one or the other of the links, the length of the chain D may be suitably adjusted.

Having thus described my invention, I claim as new and desire to secure by Letters Patent—

The mode of stowing cotton by connecting together the two opposite upper and lower surfaces of two adjacent bales by the hooks E and adjustable chain D while under the pressure of the jack-screw, substantially as and for the purpose specified.

DANIEL HAYES.

Witnesses:
JOHN GREYES,
P. W. RAIMPIO.